(12) United States Patent
Chennakeshu et al.

(10) Patent No.: US 6,314,081 B1
(45) Date of Patent: *Nov. 6, 2001

(54) HIGH POWER SHORT MESSAGE SERVICE USING DEDICATED CARRIER FREQUENCY

(75) Inventors: Sandeep Chennakeshu; Nils Rydbeck; Amer A. Hassan, all of Cary, NC (US); Paul W. Dent, Stehag (SE)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/588,507

(22) Filed: Jan. 18, 1996

(51) Int. Cl.[7] ............................... H04J 11/00; H04L 7/00
(52) U.S. Cl. .................. 370/203; 370/512; 375/364; 375/367
(58) Field of Search .................................. 370/316, 317, 370/318, 321, 323, 324, 325, 337, 347, 503, 203; 455/10, 13.2, 13.4, 33.1, 38.3, 54.1, 56.1, 63; 375/254, 285, 296, 346, 354, 362, 364, 365, 366, 367

(56) References Cited

U.S. PATENT DOCUMENTS

| 4,145,573 | 3/1979 | Arnold . |
| 4,301,533 | 11/1981 | Acampora et al. . |

(List continued on next page.)

FOREIGN PATENT DOCUMENTS

| 26 40 756 | 3/1978 | (DE) . |
| 0 086 541 | 8/1983 | (EP) . |
| 0 212 667 | 3/1987 | (EP) . |
| 0 360 589 | 3/1990 | (EP) . |
| 0 535 812 | 4/1993 | (EP) . |
| 0 540 808 | 5/1993 | (EP) . |
| 0 565 507 | 10/1993 | (EP) . |
| 0 632 605 | 1/1995 | (EP) . |
| 0 641 100 | 3/1995 | (EP) . |
| 0 671 824 | 9/1995 | (EP) . |
| 0 684 746 | 11/1995 | (EP) . |
| 2 418 984 | 9/1979 | (FR) . |
| 81/00034 | 1/1981 | (WO) . |
| 94/13113 | 11/1993 | (WO) . |
| 95/25052 | 12/1993 | (WO) . |
| 94/01943 | 1/1994 | (WO) . |
| 95/12931 | 11/1994 | (WO) . |
| 95/12936 | 5/1995 | (WO) . |
| 95/31878 | 5/1995 | (WO) . |
| 93/26112 | 9/1995 | (WO) . |
| 96/04718 | 2/1996 | (WO) . |

OTHER PUBLICATIONS

Federal Register/vol. 64, No. 146/Friday, Jul. 30, 1999. 41392–94.*
Mehrotra, Cellular Radio: Analog and Digital Systems, pp. 308–327, 1994.*
Lee, Mobile Cellular Telecommunications Analog and Digital Systems, 2nd. Edition.pp. 257–258, 1995.*

(List continued on next page.)

*Primary Examiner*—William Luther
(74) *Attorney, Agent, or Firm*—Burns, Doane, Swecker & Mathis, L.L.P.

(57) ABSTRACT

A communication system and method for transmitting relatively short data messages in the communication system. A dedicated frequency is sequentially switched into each of a plurality of satellite beams or traffic channels to transmit data messages at an increased power level to provide an increased signal margin. The increased power level of the dedicated frequency can be combined with coding and bit and message repetition to further increase the signal margin.

10 Claims, 6 Drawing Sheets

U.S. PATENT DOCUMENTS

| | | |
|---|---|---|
| 4,309,764 | 1/1982 | Acampora . |
| 4,495,619 * | 1/1985 | Acampora ............................. 370/207 |
| 4,658,436 * | 4/1987 | Hill ........................................ 380/31 |
| 4,679,227 * | 7/1987 | Hughes-Hartogs .................. 370/207 |
| 4,691,314 | 9/1987 | Bergins et al. . |
| 4,731,866 | 3/1988 | Muratani et al. . |
| 4,882,765 | 11/1989 | Maxwell et al. . |
| 4,905,235 | 2/1990 | Saburi . |
| 4,910,792 | 3/1990 | Takahata et al. . |
| 4,914,651 * | 4/1990 | Lusignan ............................. 370/329 |
| 4,941,144 | 7/1990 | Mizukami . |
| 5,278,833 | 1/1994 | Crisler et al. . |
| 5,295,140 | 3/1994 | Crisler et al. . |
| 5,406,593 | 4/1995 | Chennakeshu et al. . |
| 5,420,864 | 5/1995 | Dahlin et al. . |
| 5,450,395 * | 9/1995 | Hostetter et al. .................... 370/320 |
| 5,487,185 * | 1/1996 | Halonen .............................. 455/127 |
| 5,563,606 | 10/1996 | Wang . |
| 5,594,776 | 1/1997 | Dent . |
| 5,633,874 | 5/1997 | Diachina et al. . |
| 5,745,523 | 4/1998 | Dent et al. . |
| 5,822,310 | 10/1998 | Chennakeshu et al. . |

OTHER PUBLICATIONS

S. A. Fechtel et al. "A New Mobile Digital Radio Transceiver Concept Using Low–Complexity Combined Equalization/Trellis Decoding and A Near Optical Receiver Sync Strategy", PIMRC '92, The Third IEEE International Symposium on Personal, Indoor and Mobile Radio.

B. R. Vojcic et al., "Power Control Versus Capacity of a CDMA System Operating Over a Low Earth Orbiting Satellite Link", GLOBECOM '93, IEEE Global Telecommunications Conference (Cat. No. 93CH3250–8), pp. 40–44, vol. 4.

Siegman M. Redl et al., "An Introduction to GSM," Artech house, Inc. pp. 46–99.

E. Del Re et al., "The GSM Procedures in an Integrated Cellular/ Satellite System", IEEE Journal of Selected Areas in Communications, vol. 13, Issue 2, pp. 421–430/.

M. Luglio, "Fade Countermeasures in Ka Band: Application of Frequency Diversity to a Satellite System", Tenth International Conference on Digital Satellite Communications (Conf. Publ. No. 403), pp. 143–151, vol. 1.

* cited by examiner

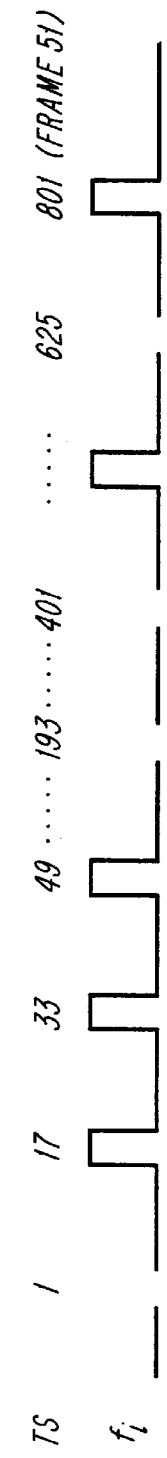
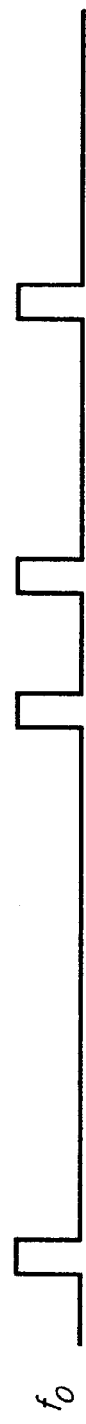
FIG. 5

FIG. 6

| 8.25 BITS | 3t | 64 DATA BITS | 14 BEAM ID | 64 DATA BITS | 3t | 8.25 BITS |

HIGH POWER SHORT MESSAGE SERVICE USING DEDICATED CARRIER FREQUENCY

CROSS-REFERENCE TO RELATED APPLICATIONS

The present application is related to the following copending commonly-assigned U.S. patent applications: Ser. No. 08/559,692, filed Nov. 15, 1995; Ser. No. 08/570,015, filed Dec. 27, 1995 now U.S. Pat. No. 5,822,310; and Ser. No. 08/578,945, filed Dec. 27, 1995.

FIELD OF THE INVENTION

The present invention generally relates to radiocommunication systems and more particularly relates to a system and method for reliably transmitting alphanumeric messages via radiocommunication signals under non-ideal conditions.

BACKGROUND OF THE INVENTION

Referring to FIG. 1, a typical cellular mobile radiocommunication system is shown. The typical system includes a number of base stations similar to base station 110 and a number of mobile units or stations similar to mobile 120. Voice and/or data communication can be performed using these devices or their equivalents. The base station includes a control and processing unit 130 which is connected to the MSC (mobile switching center) 140 which in turn is connected to the public switched telephone network (not shown).

The base station 110 serves a cell and includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver broadcasts the traffic or voice channels which can include digital control channel location information.

When the mobile 120 first enters an idle mode, it periodically scans the control channels of base stations like base station 110 for the presence of a paging burst addressed to the mobile 120. The paging burst informs mobile 120 which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in U.S. patent application Ser. No. 07/967,027 entitled "Multi-Mode Signal Processing" filed on Oct. 27, 1992 to P. Dent and B. Ekelund, now U.S. Pat. No. 5,745,523 the entirety of which is incorporated herein by reference. It will be appreciated that the base station may be replaced by one or more satellites in a satellite-based mobile radiocommunication system.

To increase radiocommunication system capacity, digital communication and multiple access techniques such as Frequency Division Multiple Access (FDMA), Time Division Multiple Access (TDMA), and Code Division Multiple Access (CDMA) may be used. The objective of each of these multiple access techniques is to combine signals from different sources onto a common transmission medium in such a way that, at their destinations, the different channels can be separated without mutual interference. In a FDMA system, users share the radio spectrum in the frequency domain. Each user is allocated a part of the frequency band which is used throughout a conversation. In a TDMA system, users share the radio spectrum in the time domain. Each radio channel or carrier frequency is divided into a series of time slots, and individual users are allocated a time slot during which the user has access to the entire frequency band allocated for the system (wideband TDMA) or only a part of the band (narrowband TDMA). Each time slot contains a "burst" of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user. CDMA combines FDMA and TDMA. In a CDMA system, each user is assigned a unique pseudorandom user code to uniquely access the frequency time domain. Examples of CDMA techniques include spread spectrum and frequency hopping.

In a TDMA system, the successive time slots assigned to the same user, which are usually not consecutive time slots on the radio carrier, constitute the user's digital traffic channel, which is considered to be a logical channel assigned to the user. The organization of TDMA channels, using the GSM standard as an example, is shown in FIG. 2. The TDMA channels include traffic channels TCH and signalling channels SC. The TCH channels include full-rate and half-rate channels for transmitting voice and/or data signals. The signalling channels SC transfer signalling information between the mobile unit and the satellite (or base station). The signalling channels SC include three types of control channels: broadcast control channels (BCCHs), common control channels (CCCHs) shared between multiple subscribers, and dedicated control channels (DCCHs) assigned to a single subscriber. A BCCH typically includes a frequency correction channel (FCH) and a synchronization channel (SCH), both of which are downlink channels. The common control channels (CCCHs) include downlink paging (PCH) and access grant (AGCH) channels, as well as the uplink random access channel (RACH). The dedicated control channels DCCH include a fast associated control channel (FACCH), a slow associated control channel (SACCH), and a standalone dedicated control channel (SDCCH). The slow associated control channel is assigned to a traffic (voice or data) channel or to a standalone dedicated control channel (SDCCH). The SACCH channel provides power and frame adjustment and control information to the mobile unit.

The frequency correction channel FCH of the broadcast control channel carries information which allows the mobile unit to accurately tune to the base station. The synchronization channel SCH of the broadcast control channel provides frame synchronization data to the mobile unit.

Using a GSM-type system as an example, the slow associated control channel SACCH can be formed by dedicating every 26th TDMA frame to carrying SACCH information. Each SACCH frame includes 8 time slots (1 SACCH slot for each traffic slot in the frame), allowing one unique SACCH channel for each mobile communication link. The base station or satellite sends commands over the SACCH channel to advance or retard the transmission timing of the mobile unit to achieve time alignment between different mobile bursts received at the base station or satellite.

The random access channel RACH is used by the mobiles to request access to the system. The RACH logical channel is a unidirectional uplink channel (from the mobile to the base station or satellite), and is shared by separate mobile units (one RACH per cell is sufficient in typical systems, even during periods of heavy use). Mobile units continuously monitor the status of the RACH channel to determine if the channel is busy or idle. If the RACH channel is idle, a mobile unit desiring access sends its mobile identification number, along with the desired telephone number, on the RACH to the base station or satellite. The MSC receives this information from the base station or satellite and assigns an idle voice channel to the mobile station, and transmits the channel identification to the mobile through the base station or satellite so that the mobile station can tune itself to the new channel. All time slots on the RACH uplink channel are used for mobile access requests, either on a contention basis or on a reserved basis. Reserved-basis access is described in U.S. patent application No. 08/140,467, entitled "Method of Effecting Random Access in a Mobile Radio System", which was filed on Oct. 25, 1993, now U.S. Pat. No. 5,420,864 and which is incorporated in this application by reference. One important feature of RACH operation is that reception of some downlink information is required, whereby mobile stations receive real-time feedback for every burst they send on the uplink. This is known as Layer 2 ARQ, or automatic repeat request, on the RACH. The downlink information preferably comprises twenty-two bits that may be thought of as another downlink sub-channel dedicated to carrying, in the downlink, Layer 2 information specific to the uplink. This flow of information, which can be called shared channel feedback, enhances the throughput capacity of the RACH so that a mobile station can quickly determine whether any burst of any access attempt has been successfully received. As shown in FIG. 2, this downlink information is transmitted on channel AGCH.

Transmission of signals in a TDMA system occurs in a buffer-and-burst, or discontinuous-transmission, mode: each mobile unit transmits or receives only during its assigned time slots in the TDMA frames on the mobile unit's assigned frequency. At full rate, for example, a mobile station might transmit during slot 1, receive during slot 2, idle during slot 3, transmit during slot 4, receive during slot 5, and idle during slot 6, and then repeat the cycle during succeeding TDMA frames. The mobile unit, which may be battery-powered, can be switched off (or "sleep") to save power during the time slots when it is neither transmitting nor receiving.

To increase mobility and portability, radiocommunication subscribers tend to prefer mobile units having a relatively small, omnidirectional (and accordingly, less powerful) antenna over mobile units having a large or directional antenna. Because of this preference, it is sometimes difficult to provide sufficient signal strength for the exchange of communication signals between typical mobile units having a small, omnidirectional antenna and a mobile switching center (MSC) or satellite. This problem is particularly serious in satellite-based mobile radiocommunications.

A satellite-based mobile radiocommunication system provides radiocommunication services to particular geographical areas of the earth using one or more partially overlapping satellite beams. Each satellite beam has a radius of up to about 1000 KM. Due to the power limitations of a satellite, it is not practical to provide a high link margin in every beam simultaneously.

Because mobile satellite links are severely power limited, communication is typically limited to line-of-sight channels with Ricean fading. Ricean fading occurs from a combination of a strong line-of-sight path and a ground-reflected wave, along with weak building-reflected waves. These channels require a communications link margin of approximately 10 dB or more to achieve voice communication in ideal or near-ideal conditions, such as when the mobile radiotelephone unit antenna is properly deployed and the unit is in an unobstructed location. In these near-ideal channels, the mobile unit can successfully monitor the paging channel to detect incoming calls. In non-ideal conditions, such as when the mobile unit antenna is not deployed or the mobile unit is in an obstructed location (e.g., inside a building) reflected waves, including ground-reflected and building-reflected waves, become dominant. The channels in these non-ideal conditions are characterized by flat Rayleigh fading (the most severe type of fading) with severe attenuation. In such channels, a link margin of as much as 30 dB or more is required to achieve reliable voice or data communication, and the mobile unit in this case cannot monitor the paging channel to detect incoming calls. In these non-ideal conditions, a short message service (SMS) is desirable. Due to the power limitations of the satellite, SMS is particularly effective when used in non-ideal conditions to alert a mobile station user of an incoming call. The mobile station user may then change locations to receive or return the call. The term "link margin" or "signal margin" refers to the additional power required to offer adequate service over and above the power required under ideal conditions—that is, a channel having no impairments other than additive white Gaussian noise (AWGN). "Impairments" include fading of signal amplitude, doppler shifts, phase variations, signal shadowing or blockage, implementation losses, and anomalies in the antenna radiation pattern.

Whether transmitting voice or data, it is frequently desirable to increase the signal margin to ensure reliable radiocommunication performance, particularly in power-limited satellite applications. Known methods of increasing the link margin of a signal include expanding the channel bandwidth to achieve frequency selectivity or to use forward error correction coding (such as convolutional coding), increasing signal power, and bit repetition (which may be viewed as a form of forward error correction coding). Each of these methods has significant limitations. Bandwidth expansion is typically achieved by known methods such as signal spreading and low bit rate error correction coding, and results in a signal which is less sensitive to fading. Bandwidth expansion reduces spectrum allocation efficiency. Further, in a SMS application, if the expanded bandwidth of the voice channel is different from the bandwidth of the message channel, two separate and complete radios (one for each service) will be required in the mobile unit, thereby complicating its design. Also, a coherent Rake receiver or equalizer is also typically required to reduce delay spread, further complicating the design of the mobile unit. Bandwidth expansion may also be implemented by repeated transmissions of the entire voice or data message. However, under the non-ideal conditions of interest, this method is not effective because each repetition is typically below the noise floor (that is, does not have a sufficient margin), resulting in a high error rate and preventing the coherent integration of the repetitions.

Increasing signal power may also be used to provide a higher margin. Due to the power limitations of the satellite, this is typically not a practical approach. In addition to increasing the cost of the system, increased transmission power also makes it more difficult to control co-channel interference, particularly in TDMA systems with narrow re-use margins. Accordingly, large power increases from the satellite to the mobile unit may be provided only during periods of relatively light use. Further, because the mobile unit is even more power limited than the satellite, this technique is typically practical only in one direction, from the satellite to the mobile unit.

Bit repetition may also be used to increase the margin. Bit repetition results in a lower error rate than message repetition, particularly in non-ideal conditions. Bit repetition causes transmission delay, which is not desirable for voice signals, for obvious reasons. However, transmission delay may be acceptable for data communications, such as a SMS feature, provided that the delay is kept to a reasonable minimum. Bit repetition is achieved by transmitting individual bits or modulation symbols, or packets of bits or modulation symbols, a plurality of times such that all repetitions are contiguous or contained within the same time slot or slots of successive TDMA frames. The receiver integrates the energy from each repetition to create a signal having a higher margin. As noted above, bit repetition can cause significant delay, depending upon the length of the message. To achieve a 30 dB signal margin, each bit will have to be repeated 1000 times. A typical short message has between 32 and 64 characters in the GSM system, the European digital standard, up to 245 characters in the DAMPS (Digital Advanced Mobile Phone Service IS-136) system currently used in the United States, and up to 160 characters in the DECT (Digital European Cordless Telephone) system. Assuming a GSM system having TDMA frames of 18.64 ms, with 16 slots per frame and 114 data bits/slot, the minimum delay for receiving a 64 character message, not including propagation time, is as follows:

64 bits×8 bits/character×1000 repetitions/bit×18.64 ms/slot×1/114 slot/data bit=84 seconds.

Such a delay is highly undesirable, even for data transmission.

It has been suggested to implement a short message service in a satellite-based telecommunications system using 2 different satellite transponders, one for voice and one for data. Different channel bandwidths are also used in this implementation. The use of multiple transponders and bandwidths results in an overly complex system.

Accordingly, it would be desirable for a radiocommunication system to allow for transmission of signals at an increased signal margin without significant delay and without a significant increase in power.

It would be further desirable for a communication system to allow for transmission of signals with an increased signal margin without requiring expansion of the channel bandwidth, multiple bandwidths, or multiple transponders.

It would also be desirable for a TDMA communication system to allow for transmission of signals with an increased signal margin without requiring a change in the structure or organization of TDMA frames.

It would be further desirable for a mobile radiocommunication system to allow for transmission of data messages originating from either a mobile unit or from a satellite or base station with an increased signal margin.

It would be further desirable for a communication system to selectively increase the signal margin of a communication link for the transmission of data messages.

SUMMARY OF THE INVENTION

The above-noted and other limitations of conventional communication systems and methods are overcome by the present invention, which provides for a high-penetration transmission method for transmitting short alphanumeric messages in which signal margin is increased by a combination of bit repetition and a relatively small increase in power. According to exemplary embodiments, the combination of bit repetition and a relatively small increase in power avoids the unacceptable delays characteristic of systems which rely solely on repetition to increase the signal margin. Likewise, the combination of repetition and a relatively small increase in power avoids the co-channel interference problems of systems which rely solely on increased power to increase the signal margin.

According to an exemplary embodiment of the present invention, a mobile radiocommunication system is provided with a short message service feature for transmitting alphanumeric messages to and from a mobile unit. In order to ensure reliable transmission over channels having severe attenuation, the data message is encoded; the encoded message is divided into packets or groups of one or more bits each; each packet is transmitted multiple times over a dedicated carrier frequency at a power level greater than the power level for voice transmission; and the transmissions are integrated and checked for errors at the receiver to form a signal having an increased signal margin. The carrier frequency for transmitting message data for a satellite is multiplexed with, or switched into, the satellite beams. Thus, a given satellite beam exchanging voice and control data with a particular subscriber over an assigned frequency will stop exchanging voice and control data when the dedicated carrier frequency is switched into the beam, and will instead be used to transmit message data. When the dedicated frequency is switched out of one beam and into another beam, the first beam will again be used to exchange voice and control information.

BRIEF DESCRIPTION OF THE DRAWINGS

The foregoing objects, features and advantages of the present invention will be more readily understood upon reading the following detailed description in conjunction with the drawings in which:

FIG. 5 is a timing diagram showing an embodiment of the data transmission method according to the present invention;

FIG. 6 is a diagram showing an exemplary message burst format; and

DETAILED DESCRIPTION OF THE PREFERRED EMBODIMENTS

While the following description is directed toward a short message service implemented in a satellite-based radiocommunication system, it will be appreciated that the present invention may also be applied to other types of communication systems.

Figure 3:
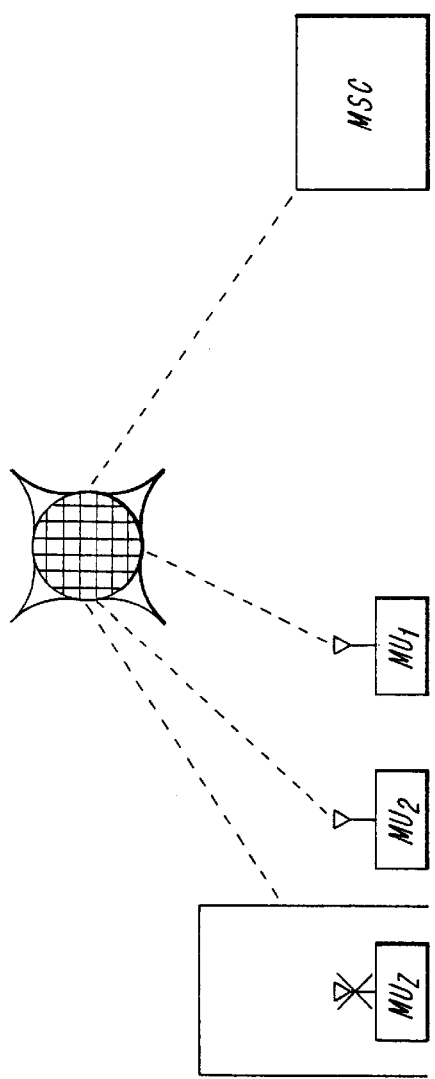
FIG. 3 is a diagram of a satellite-based mobile radiocommunication system in which the signal transmission method of the present invention may be implemented.

In a satellite-based mobile radiocommunication system, a communication link for transmitting voice or data may be established between a mobile station and either a standard telephone or a second mobile station through one satellite, multiple satellites, or a combination of one or more satellites and the PSTN (public switched telephone network). Such a system, as shown in FIG. 3, may be desirable to achieve a broad geographical coverage in which few or no base stations are present, and additional base stations are not practical, such as in rural areas. Due to the inherent power limitations of satellites, voice communications links between the satellite and the mobile station require ideal or near-ideal conditions; that is, conditions such as line-of-sight communication with the mobile station's antenna properly deployed. In non-ideal conditions, such as when the mobile station is shadowed (e.g., inside a building, etc.) or when the mobile antenna is not properly deployed, the power or signal margin requirements for communication increases significantly due to the increased attenuation in the channel. In such situations (shown as MUz in FIG. 3), Rayleigh fading often prevents satisfactory communication, and it is therefore desirable to send a short alphanumeric message to the mobile station. The message may be used, for example, to inform the subscriber of an incoming call. The present invention ensures reliable transmission of the message by providing for an efficient technique for increasing signal margin without significant delay, power increase, or co-channel interference.

For purposes of illustration only, and without limiting the scope of the invention, a satellite-based GSM radiocommunication system using TDMA channels may be assumed to exhibit the following conditions. The communication channel has no line of sight component and is subject to flat Rayleigh fading with severe attenuation. As will be appreciated by those of skill in the art, Rayleigh (or multipath) fading is a phenomenon which occurs when multipath waves form standing-wave pairs due to reflection from the physical structures in a service area. The standing-wave pairs summed together form an irregular wave fading structure. When the mobile unit is stationary, it receives a constant signal. However, when the mobile unit is moving, the fading structure causes fading to occur which increases as the mobile unit moves faster. The mean signal level of the non-ideal Rayleigh channel is approximately 20–30 dB below the signal level of a near-ideal line-of-sight channel.

In order to ensure reliable transmission of a short message to the mobile unit in non-ideal conditions, the signal margin must be increased. According to the present invention, bit repetition and power increase can be combined to provide an increased signal margin without significant delay.

It will be appreciated that decibels (dB) are units used to express ratios of power, current, or voltage. Specifically, a power ratio (P2/P1) may be expressed in decibels by the formula dB=10 log (P2/P1). A signal margin of 30 dB requires a power ratio of 1000, since 10 log 1000=30. Thus, to achieve this signal margin solely by bit repetition, each bit must be repeated 1000 times and the signal margin from each repetition must be integrated at the receiver, resulting in the 82 second delay calculated above. However, to achieve a 15 dB margin, the required power ratio is only 31.623, since 10 log 31.623=15. Thus, a 30 dB signal margin may be provided by increasing the power by 15 dB and repeating each bit approximately 31 times. Using this technique, the bit-repetition delay for a 64 character message is (64 characters×8 bits/character×31 repeats/bit×18.64 ms/slot×1/114 slot/bits) approximately 2.5 seconds. As a result, the bit repetition delay is maintained at a reasonable level, and the power increase is also maintained at a reasonable level, thereby avoiding co-channel interference. It will be appreciated that many different combinations of repetitions and power increases are possible to achieve successful communication in Rayleigh fading environments without significant delay. Further, rather than repeating individual bits of a digital signal, groups of bits may be repeated.

Figure 4:
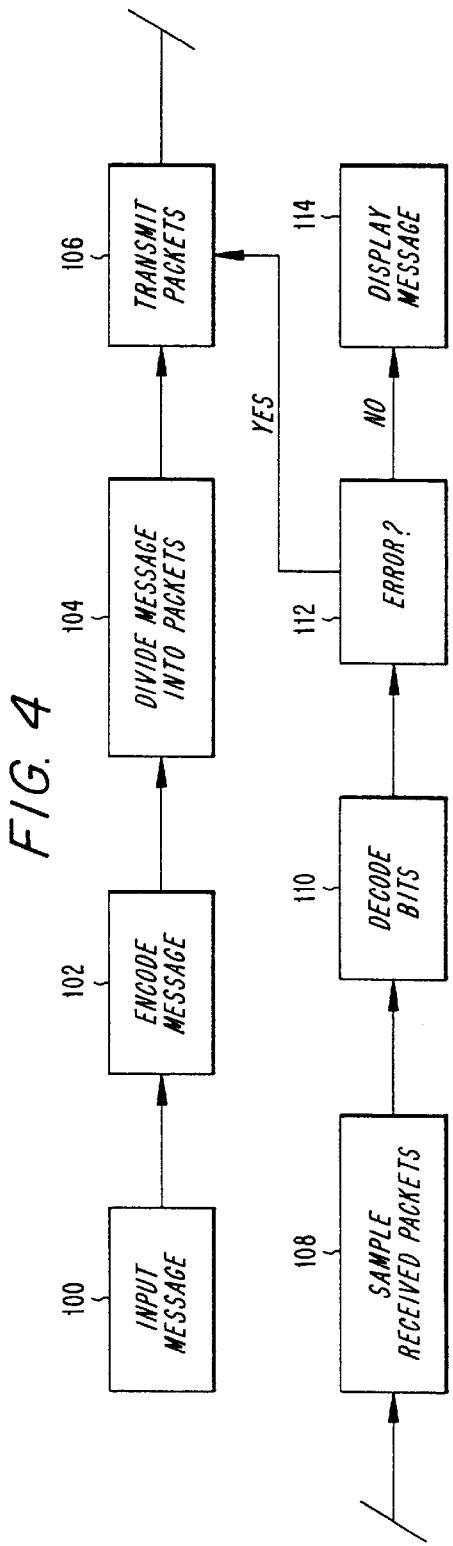
FIG. 4 is a flow chart describing the transmission of a short message according to an embodiment of the present invention.

Referring now to FIG. 4, a flow chart describing the transmission of a short message using the transmission method of the present invention is shown. Referring now to FIG. 4, a flow chart describing the transmission of a short message using the transmission method of the present invention is shown. In step 100, a sending party inputs a message to be transmitted to a receiving subscriber. The message may be input into the communication system directly by the sending party through a mobile unit, a standard telephone, a computer terminal, or equivalent device, or the message may be input indirectly by calling an operator at a service center who inputs the message into the system. The message address is used to determine which satellite beam or assigned frequency is being used to serve the recipient subscriber. In step 102, the information bits comprising the short message are encoded by an encoder located at the transmitter with an error detection code, such as CRC. The encoded message constitutes one or more codewords, each containing codeword bits or symbols. It should be recognized that the transmitter may be the satellite, a base station, or a mobile unit.

In step 104, bit repetition can be employed, such that each of the codeword bits or symbols output by the encoding means are repeated N times to form a packet containing N bits. It will be apparent that, instead of repeating individual bits or symbols, groups of two or more bits or symbols, or the entire codeword or codewords could also be repeated.

Packets are then transmitted in step 106 such that each slot within a TDMA frame includes one or more packets of repeated bits, error detection coding bits, and a sync burst to enable the receiver to estimate the channel quality. All bits comprising the encoded short message are transmitted in this fashion. If bit repetition and message repetition are employed, once the entire encoded message has been transmitted, the transmission of the message (in the form of packets of N codeword bits) can be repeated M times to achieve the desired signal margin. It will be appreciated that, since the short message may be transmitted from a satellite, base station, or mobile station, encoding and transmitting functions are provided in each of these devices. It will also be appreciated that, in order to implement the technique of the present invention, means are included in the transmitter to determine the number of bit repetitions N, message repetitions M, and power increase necessary to achieve the signal margin required for successful transmission of the message.

Figure 1:
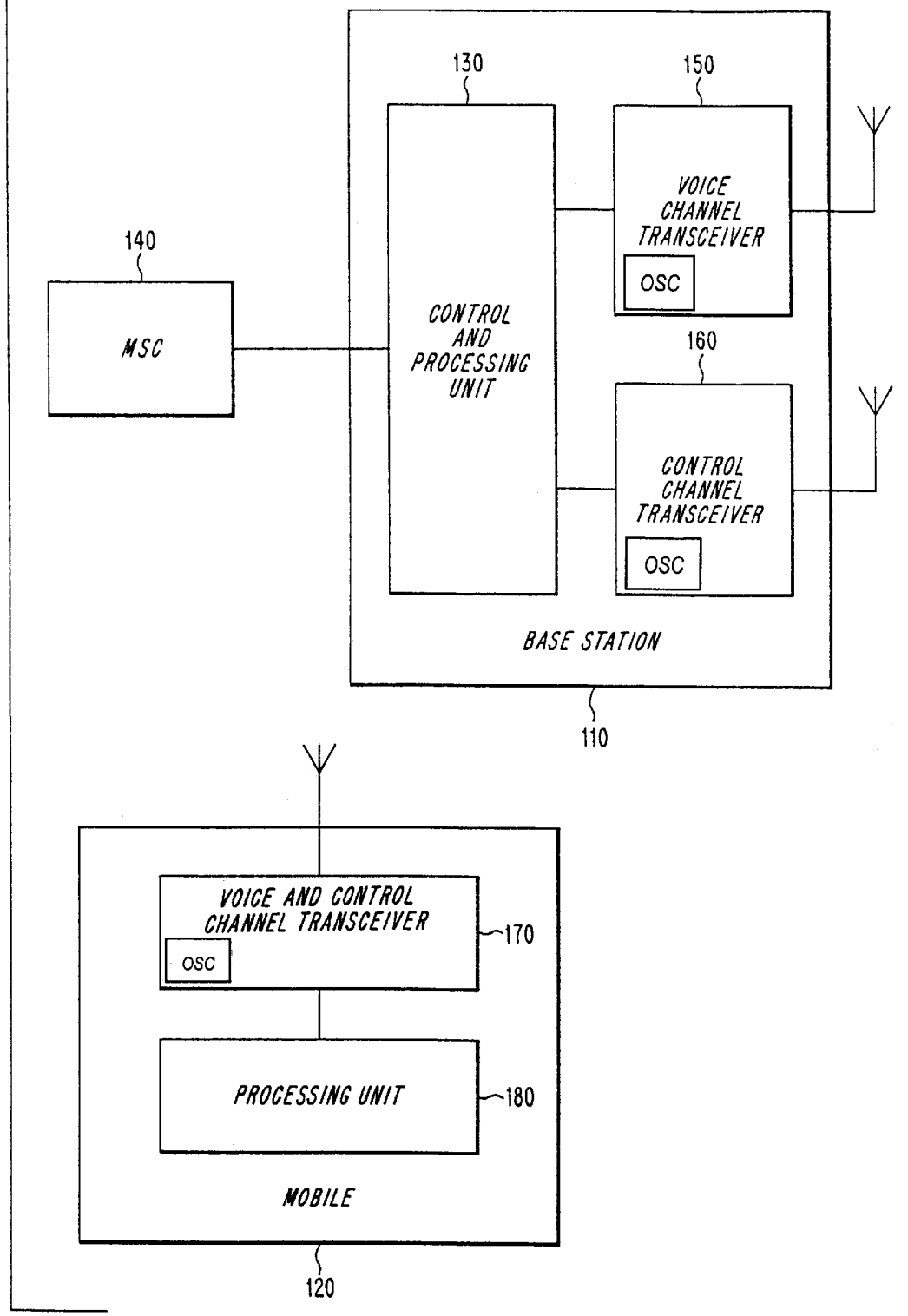
FIG. 1 is a block diagram of an exemplary mobile radiocommunication system.
Figure 2:
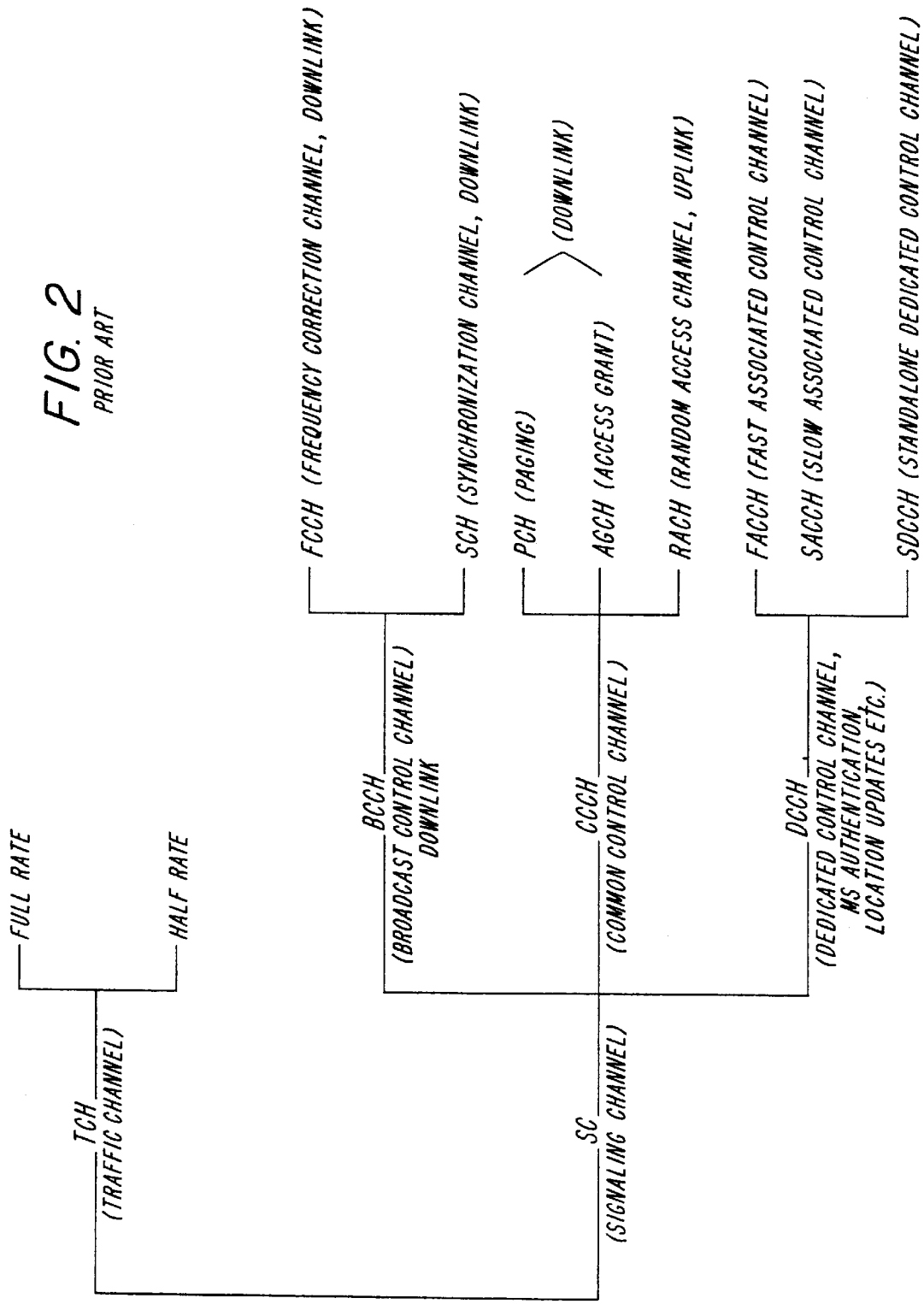
FIG. 2 is a diagram showing the organization of channels in a typical GSM digital radiocommunication system.

Referring still to FIG. 4, in step 108, the receiving device (i.e., the mobile unit, satellite, base station, or equivalent device) samples the received signal, including the repeated encoded message bits, error detection bits, and channel quality estimation bits, and generates a metric sum of the form $$\Upsilon_j = \sum_{i=1}^{N} |r_{ij} - \hat{C}_j S|^2$$

where $r_{ij}$ is the sampled received signal corresponding to the ith repetition of the information bit or symbol S in packet repeat j, and $\hat{C}_j$ is the corresponding estimate of channel quality. In step 110 a decoder contained in the receiving device decodes each encoded bit or symbol in the TDMA slot from the metric sums, using soft combining or majority logic voting, or other suitable decoding methods. To implement soft combining, the decoder adds metric sums as $$\Upsilon = \sum_{j=1}^{M} \Upsilon_j$$

and makes a bit or symbol decision based on the sum. To implement majority logic voting, the decoder makes a preliminary bit or symbol decision for each metric $y_j$ and then a makes a final bit or symbol decision by comparing all of the preliminary decisions. Thus, if the decoder has made M preliminary decisions, the decoder will determine that the corresponding information bit is a 1 if more than half of the preliminary decisions were 1; otherwise, the decoder will determine that the corresponding information bit is a 0. The same logic is used to decode a bit that is a 0. To prevent an error which might result if exactly half of the preliminary decisions are 0 and exactly half of the preliminary decisions are 1, M is chosen to be an odd number. The decoded bits are combined coherently and the multiple transmissions of the message are combined coherently to generate a message signal having an increased margin. Those of ordinary skill in the art will appreciate that the processing unit 180 (FIG. 1) can perform the integration.

In step 112, an error detector contained in the receiving apparatus detects errors based on the CRC error detection coding provided at the transmitting apparatus. If no errors are detected, the message is displayed on the receiving subscriber's mobile unit in step 114. If an error is detected, then the message is not displayed at the receiving apparatus, the user is notified of an erroneous message by a displayed error message or by an audio signal, and the receiver requests the transmitter to retransmit the message or the erroneous parts of the message in accordance with a bidirectional radio protocol.

According to the present invention, repeated transmission of messages may be used in combination with repetition of individual portions of a message. That is, individual portions of the message may be transmitted multiple times, and when the entire message has been transmitted by means of the repeated transmissions of the message portions, the entire message may be transmitted again.

According to an exemplary embodiment of the present invention, the transmission of message data in step 106 is performed during a time interval when a carrier frequency, dedicated to transmitting message data, is switched into the satellite beam and/or replaces the carrier frequency assigned to the recipient subscriber. The dedicated carrier frequency is switched into each satellite beam (e.g., by switching a local oscillator in the transmitter) at predetermined message intervals. The switching may be performed by a multiplexer located in the satellite or base station, or by other suitable means, and the message intervals may be selected in a variety of ways. According to one example, the predetermined message interval may be during the slow associated control channel (SACCH) frames or other frames selected for use as message frames in a short message service. Such a short message service is disclosed in applicants' copending, commonly assigned application, U.S. patent application Ser. No. 08/578,945, entitled "High Power Short Message Service Using TDMA Frames", filed on Dec. 27, 1995, now pending the entirety of which is incorporated herein by reference. According to a second example, the predetermined message interval may be during slots selected from the broadcast control channel (BCCH) or other group of n slots occurring in each frame or group of frames. Such a short message service is disclosed in applicants' copending, commonly assigned application, U.S.patent application Ser. No. 08/579,015, entitled "High Power Short Message Service Using Broadcast Control Channel", filed Dec, 27, 1995, now U.S. Pat. No. 5,822,310, the entirety of which is incorporated herein by reference. It will be appreciated that other intervals may be selected as message intervals for a short message service using the dedicated carrier frequency according to the present invention.

When the dedicated carrier frequency is switched into a beam and/or replaces a frequency, the power used to transmit signals to the receiver is increased to a level greater than the power level used to transmit signals over the traffic or control channels. The receiver synchronizes itself (e.g., using the processing unit 180 of FIG. 1) to receive the message over the dedicated frequency in a manner which will be described later.

Referring now to FIG. 5, a timing diagram of a SMS service according to an exemplary embodiment of the present invention is shown. The high power short message service (HP-SMS) is provided via a dedicated carrier of, e.g., 200 KHz, which is staggered in time with, e.t., BCCH bursts. $f_0$ is the frequency of the dedicated carrier for HP-SMS, and $f_i$ is a preselected carrier frequency with BCCH time multiplexed with traffic channels (only BCCH bursts are shown in the FIG. 5). Power is supplied for the $f_0$-carrier only during the predetermined message intervals, which in this case are the FCH and SCH channels in the $f_i$-bursts; power is not supplied to the $f_i$ carrier during the predetermined message intervals.

In this embodiment, the FCH and SCH provide 4 bursts per multi-frame of message capacity. A multi-frame is chosen to consist of 51 frames, i.e., 51×16 time-slots, and lasts for 470 ms. As shown in FIG. 5, these 4 bursts occur in frames 1,13,26 and 40 (that is with frame spacings of 12, 13, 12, 14); a fifth burst can also be used to include a unique word. Alternatively, all the 4 message bursts can be contiguous in time. In both transmission methods, the message frames are orthoganally staggered in different beams, to ensure that the 8 beams transmitting BCCH at the same time do not transmit message data at the same time. The message slot is therefore transmitted only in one beam at a time, maintaining a substantially constant transmitter load.

Referring now to FIG. 6, each message burst contains 156.25 bits, which include 8.25 bits for guard and ramp up/down, and 6 tail bits. The remaining 142 bits are divided into a 14 bit beam ID and 128 data-code bits. The 128 data-code bits can be K orthogonal code patterns selected by $\log_2$ K information bits. The 128 data-code bits corresponds to 7 message bits. Assuming 2 repetitions of a 126-bit message, 252 bits (2×126) must be delivered. Hence, a message can be delivered in 36 HP-SMS bursts. This corresponds to a message delivery in 9×51 TDMA frames or 8.47 seconds/message. With 121 beams the number of messages delivered per second from a satellite will be (121/8.47)≈14 messages.

In one implementation, the receiver synchronizes itself to receive the data message in two steps, coarse synchronization and fine synchronization.

In the coarse synchronization step, synchronization is achieved to within approximately 7 seconds using, for example, the energy profile method. According to the energy profile method, synchronization is performed based on the strength of the signal received by the receiver. As will be discussed in more detail below, the power profile method accurately acquires initial synchronization over the HP-SMS channel, even at very low signal to noise ratios (SNRs).

In the fine synchronization step, synchronization to the bit level is obtained by correlating the orthogonal data-codes in each burst. The correlations are added over the repeats to provide an adequate step to reliably decode message data. In this step, synch is achieved to within a fraction of a channel symbol interval.

In this embodiment, the receiver synchronizes specifically to the HP-SMS FCH and SCH channels, and the sleep cycle can be determined in accordance with these channels. In the HP-SMS mode, the mobile wakes up for 4 slots every 51 TDMA frames, implying a duty cycle of 1/204. However, in the HP-SMS mode the mobile may also wake up to check if it can receive a normal calling channel or a cellular channel. This will typically require the mobile to wake up for another 4–8 slots every 51 frames, resulting in a duty cycle of around 1.5%.

The beam ID in each message burst can be used as a pointer to indicate the BCCH carrier in a beam. The BCCH is transmitted on a limited number of frequencies and never more than one per beam. The mobile terminal can achieve coarse synchronization to the BCCH format using signal strength profiles of the message bursts only, and then can obtain fine synchronization to the bit level by correlating with the known data codes in the message bursts.

To maximize capacity, the dedicated carrier frequency can hop on all beams in one of every three multi-frames, and can be flexible in the other two multi-frames. To accommodate peak HP-SMS capacity in a beam, a message burst can request a user to look for a message in a time slot at a later time.

The power profile method will now be described for the case when the four message slots occur together. The method is easily extended to the case where the message slots are staggered.

The receiver samples the signal at one sample per bit and accumulates the signal samples over a duration equal to four time slots (625 bits; assuming 156.25 bits per slot). It stores the accumulated value in a bin. Over a duration equal to 3 multi-frames, there are 612 bins. After a time duration of 3 multi-frames, the accumulated power over four time-slots at that time is added to the corresponding bin. After sufficient accumulations, the maximum bin valve is chosen to represent the interval where the data message occurs in the beam.

The power profile method for performing coarse synchronization will now be described in more detail. A received signal includes useful real signal a and complex noise x+jy, where x and y are Gaussian random variables with unit variance. Thus, the carrier-to-noise ratio C/N is given by $a^2/2$.

The instantaneous power is defined as $$P=(a+x)^2+y^2. \qquad (1)$$

The mean power can be shown to be $$m_s = a^2 + 2 \qquad (2)$$
$$= 2(C/N) + 2.$$

The standard deviation of P can be shown to be $$\sigma_s = 2\sqrt{a^2+1} \qquad (3)$$
$$= 2\sqrt{2*(C/N)+1}.$$

In equations (1)–(3), the subscript s indicates the fact that the useful real signal component is present in the received signal.

In the absence of a signal component, the mean and the standard deviation of the resulting noise power vector is:

$$m_n=2$$
$$\sigma_n=2. \qquad (4)$$

When power is accumulated over 3k multi-frames, i.e., over a time equal to 1.41k seconds, the number of samples over which the power is averaged is k×625. Let S denote the random variable corresponding to the average power in the bin where the useful real signal is present, and the power is accumulated over 3k multi-frames. By invoking the central limit theorem, S can be approximated by a Gaussian random variable with mean $m_s$ and standard deviation $\sigma_{as}=\sigma_s/\sqrt{625k}$. Similarly, the random variable N, which is the average power in a bin where the useful real signal component is not present, can be approximated as a Gaussian random variable with mean 2 and standard deviation $\sigma_{an}=2/\sqrt{625k}$.

Since the power profile method chooses the maximum among the different bins. the method succeeds when S is greater than the maximum of the random variables N corresponding to the other 611 bins. If M is used to denote the random variable which is the maximum of the 611N bins, the cdf of M can be expressed in terms of the cdf of the N's as $$P_M(x)=[P_N(x)]^{611} \qquad (5)$$
$$P_c=Prob\{S>M\} \qquad (6)$$

In terms of the probability density functions ps(x) of S and $P_M(x)$ of M, the correct detection probability is $$P_c = \int_{x=-\infty}^{\infty} \int_{y=-\infty}^{x} p_s(x) p_M \, dy \, dx. \qquad (7)$$

This can be rewritten as $$P_c = \int_{x=-\infty}^{\infty} p_s(x) P_M(x) dx \qquad (8)$$
$$= \int_{x=-\infty}^{\infty} p_s(x) [P_N(x)]^{611} dx.$$

Figure 7:
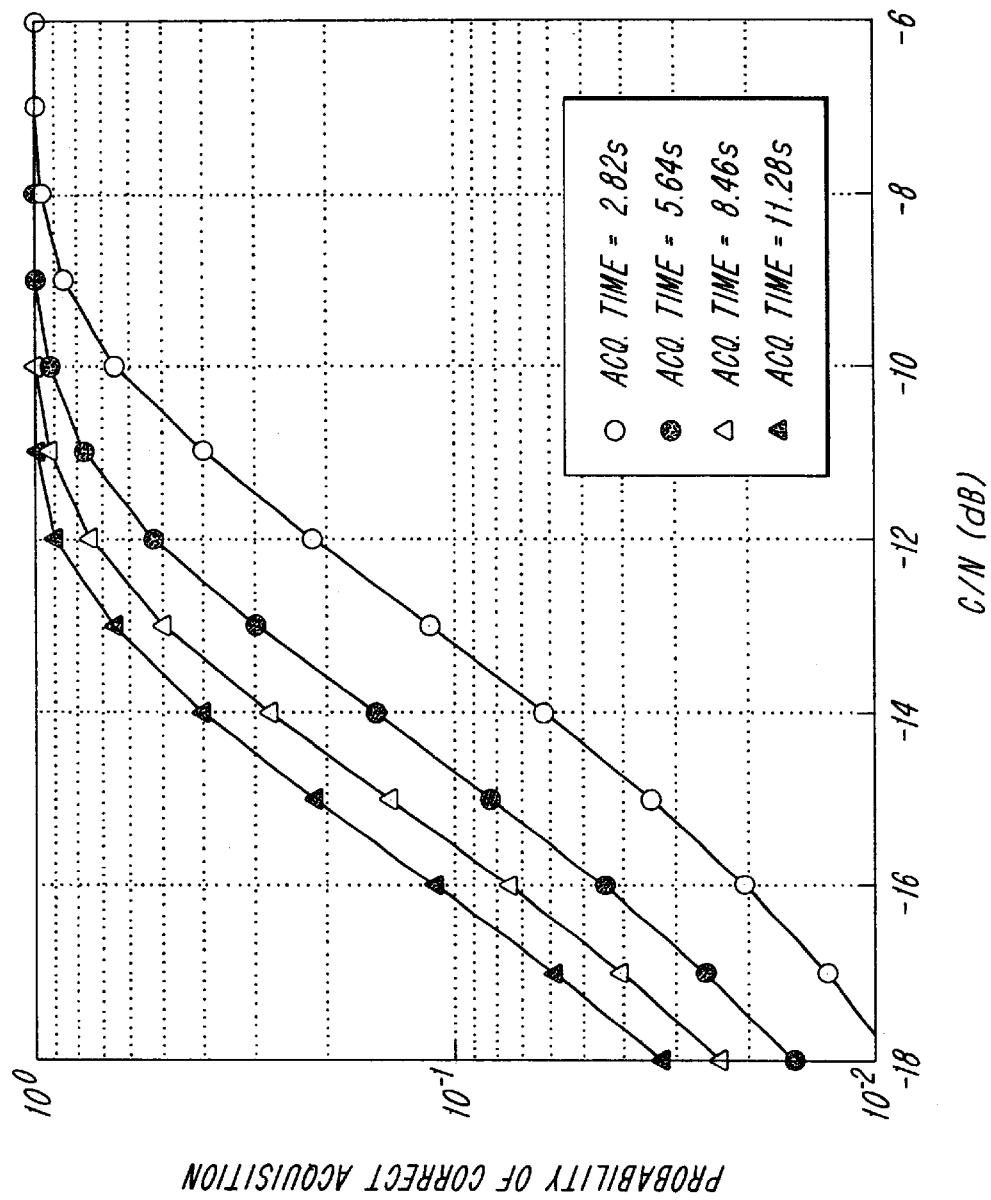
FIG. 7 is a diagram showing the acquisition performance of an exemplary synchronization method for use with the present invention.

The synchronization performance of the power profile method is shown in FIG. 7. The probability of correct detection $P_c$ is plotted against the carrier-to-noise ratio C/N for different acquisition times (values of k).

The carrier-to-noise ratio at a nominal operating point can be found using the link budget for the message channel, as shown in Table 1.

TABLE 1

C/N calculation for the HPSMS channel

| Item | Allowance |
|---|---|
| EIRP | 46.6 dBW |
| Path Loss | −182 dB |
| Margin | −27 dB |
| kT | 228.6 dBW/Hz |
| G/T | −24 dB/K |
| Noise bandwidth | 51.4 dBHz |
| C/N | −9.2 dB |

A typical synchronization acquisition performance of the power profile method on the message channel at a nominal operating point is summarized in Table 1.

TABLE 1

Acquisition Performance at Nominal Operating Point

| Acquisition Time | Acquisition Probability |
|---|---|
| 2.82s | 0.8377 |
| 5.64s | 0.9931 |
| 8.46s | 0.9998 |
| 11.28s | 1.0 |

In an implementation where message slots are borrowed from the broadcast control channel BCCH, the BCCH bursts occur every 16th slot. The slot on which the BCCH bursts occur is staggered from beam to beam in a 16-cell pattern. With 121 beams, approximately 8 beams at a time are transmitting BCCH, while the other 113 are transmitting traffic. As mentioned above, in 4 out of 51 frames, the BCCH slot is staggered with the dedicated message carrier, which also serves the FCH and SCH functions.

In an exemplary implementation, the message bursts are transmitted at 7 dB above the power provided to edge of coverage traffic channels (8 watts). Hence, the message bursts are transmitted at 40 watts. The BCCH bursts are transmitted at 16 watts which is 3 dB above the traffic channels. Since the BCCH signals in 8 beams are transmitted simultaneously the total power is 64 watts. Hence, the BCCH and message channels together take up 128 watts of the spacecraft power. This is 18.6% of the spacecraft S-band RF power (689 watts).

Preferably, increased signal margin for the message channel is provided by a combination of additional power, spreading by a 128 chip code, message repeats and/or error correction coding. In the following example, coding gain is not explicitly included. If the traffic channel provides a 7 dB minimum margin over an AWGN channel, 9 dB additional power over the traffic channel provides a 17 dB margin over an AWGN channel with rate 2/3 coding. The spreading gain achieved by using a 128 chip code for 7 information bits provides an additional gain of 11 dB ($10\log_{10}(128/7 \times 2/3)$) relative to the rate 2/3 coding. Further, message repetition with soft decision decoding provides another 3 dB gain. Thus, the overall margin over an AWGN channel is 9 dB (power increase)+7 dB (voice margin)+12.6 dB (spreading)+3 dB (message repeat)=31.6 dB.

The following table summarizes the merging and performance thresholds of the traffic, paging and message channels.

TABLE 3

Performance Thresholds

| Parameter | Traffic | BCCH | HP-SMS |
|---|---|---|---|
| EIRP (dBw) | 37.6 | 37.6 | 46.6 |
| Margin (dB) | — | 17 | 30 |
| C/No (dB) | 53.4 | 43.4 | 39.4 |
| FER | 1% | 1% | 1% |
| Ec/No (dB) | −0.9 | −10.9 | −14.9 |

While the foregoing description includes numerous details and specificities, it is to be understood that these are merely illustrative of the features and principles of the present invention, and are not to be construed as limitations. Many modifications will be readily apparent to those of ordinary skill in the art which do not depart from the spirit and scope of the invention, as defined by the following claims and their legal equivalents.

What is claimed is:

1. A communication system, comprising:
   one or more receivers, each receiver comprising means for synchronizing the receiver to receive the encoded message over the dedicated message frequency and means for integrating the multiple transmissions of portions of the encoded message and the multiple transmission of the encoded message at the receiver, wherein the means for synchronizing performs coarse synchronization of the receiver based on variations in received signal strength and performs fine synchronization of the receiver band on orthogonal datacodes contained in each portion of the encoded message; and
   one or more transmitters for exchanging communication signals with each of the one or more receivers at a first link margin over one of a plurality of frequencies assigned to one or more specific receivers of the one or more receivers, the transmitters including means for receiving a message to be transmitted to one of the receivers, means for encoding the message, means for transmitting the encoded message over a dedicated message frequency not specifically assigned to any of the receivers at a second link margin higher than the first link margin, the dedicated message frequency being different from the assigned frequencies, wherein the second link margin is provided by bit repetition of the encoded message and wherein the second link margin is further provided by transmitting the encoded message at a second power level higher than a first power level associated with the first link margin.

2. The system of claim 1, wherein the means for transmitting includes:
   means for switching an oscillator in the transmitter from the assigned frequency to the dedicated message frequency for predetermined intervals; and
   means for transmitting the encoded message over the dedicated message frequency during one or more of the predetermined intervals.

3. The system of claim 1, wherein the coarse synchronization is preformed by determining a power profile of the received signal.

4. The system of claim 2, wherein the transmitter is a satellite and the receiver is a mobile radiocommunication unit.

5. The system of claim 2, wherein the transmitter is a mobile switching center and the receiver is a mobile radiocommunication unit.

6. A method for transmitting a message between a transmitter and a receiver which exchange communication signals over a frequency assigned to the receiver at a first link margin, comprising the steps of:

inputting the message to the transmitter;

encoding the message;

transmitting the encoded message from the transmitter to the receiver over a dedicated frequency not specifically assigned to the receiver at a second link margin higher than the first link margin, the dedicated frequency being different from the assigned frequency, and the second link margin being provided by bit repetition of the encoded message, wherein the second link margin is further provided by transmitting the encoded message at a second power level higher than a first power level associated with the first link margin, synchronizing the receiver to receive the encoded message over the dedicated frequency, wherein the step of synchronizing is performed by the steps of:

coarsely synchronizing the receiver based on variations in received signal strength; and finely synchronizing the receiver based on orthologonal datacodes contained in each portion of the encoded message, and integrating the multiple transmissions of portions of the encoded message and the multiple transmission of the encoded message at the receiver.

7. The method of claim 6, wherein the step of transmitting is performed by the steps of:

switching the frequency of a local oscillator in the transmitter from the assigned frequency to the dedicated frequency for predetermined intervals; and transmitting the encoded message over the dedicated frequency during one or more of the predetermined intervals.

8. The method of claim 6, wherein the step of coarsely synchronizing is performed by determining a power profile of the received signal.

9. The method of claim 7, wherein the transmitter is a satellite and the receiver is a mobile radiocommunication unit.

10. The method of claim 7, wherein the transmitter is mobile switching center and the receiver is a mobile radiocommunication unit.

* * * * *